United States Patent [19]

Bauer

[11] 4,237,867
[45] Dec. 9, 1980

[54] SOLAR ENERGY COLLECTOR

[76] Inventor: William C. Bauer, 175 Cordova Ct., Boulder, Colo. 80303

[21] Appl. No.: 920,490

[22] Filed: Jun. 29, 1978

[51] Int. Cl.$^3$ .............................................. F24J 3/02
[52] U.S. Cl. .................................... 126/441; 126/449
[58] Field of Search ............... 126/270, 271, 449, 430, 126/436, 441, 901; 237/1 A; 350/96.10

[56] References Cited

U.S. PATENT DOCUMENTS

| | | | |
|---|---|---|---|
| 2,979,424 | 4/1961 | Whitehurst et al. | 350/96.10 X |
| 2,998,005 | 8/1961 | Johnston | 126/270 |
| 3,815,574 | 6/1974 | Gaydos, Jr. | 126/271 |
| 3,875,925 | 4/1975 | Johnston | 126/270 |
| 4,015,582 | 4/1977 | Liu et al. | 126/271 X |
| 4,018,211 | 4/1977 | Barr | 126/271 X |
| 4,038,969 | 8/1977 | Smith | 126/271 X |
| 4,078,548 | 3/1978 | Kapany | 126/271 |
| 4,082,082 | 4/1978 | Harvey | 126/270 X |
| 4,117,829 | 10/1978 | Gross et al. | 126/270 |
| 4,119,083 | 10/1978 | Heyen et al. | 126/270 |

FOREIGN PATENT DOCUMENTS 2629086  1/1978  Fed. Rep. of Germany ........... 126/270

*Primary Examiner*—Samuel Scott
*Assistant Examiner*—Randall L. Green

[57] ABSTRACT

Solar energy absorbing means in solar collectors are provided by matts of a fibrous material which by its chemical composition absorbs solar radiation, converting this energy to thermal energy within the fiber itself. The solar energy absorbing properties of the fibers are controlled by the state of oxidation and amounts of various multivalent chemical components contained within the material composing the fibers. The thermal energy thus collected is transferred to a heat transfer medium by either passing the fluid directly through the matt of fibers or through pipes or coils imbedded in the matt.

8 Claims, 3 Drawing Figures

RANDOM FIBER IN A GLASS WOOL MATT

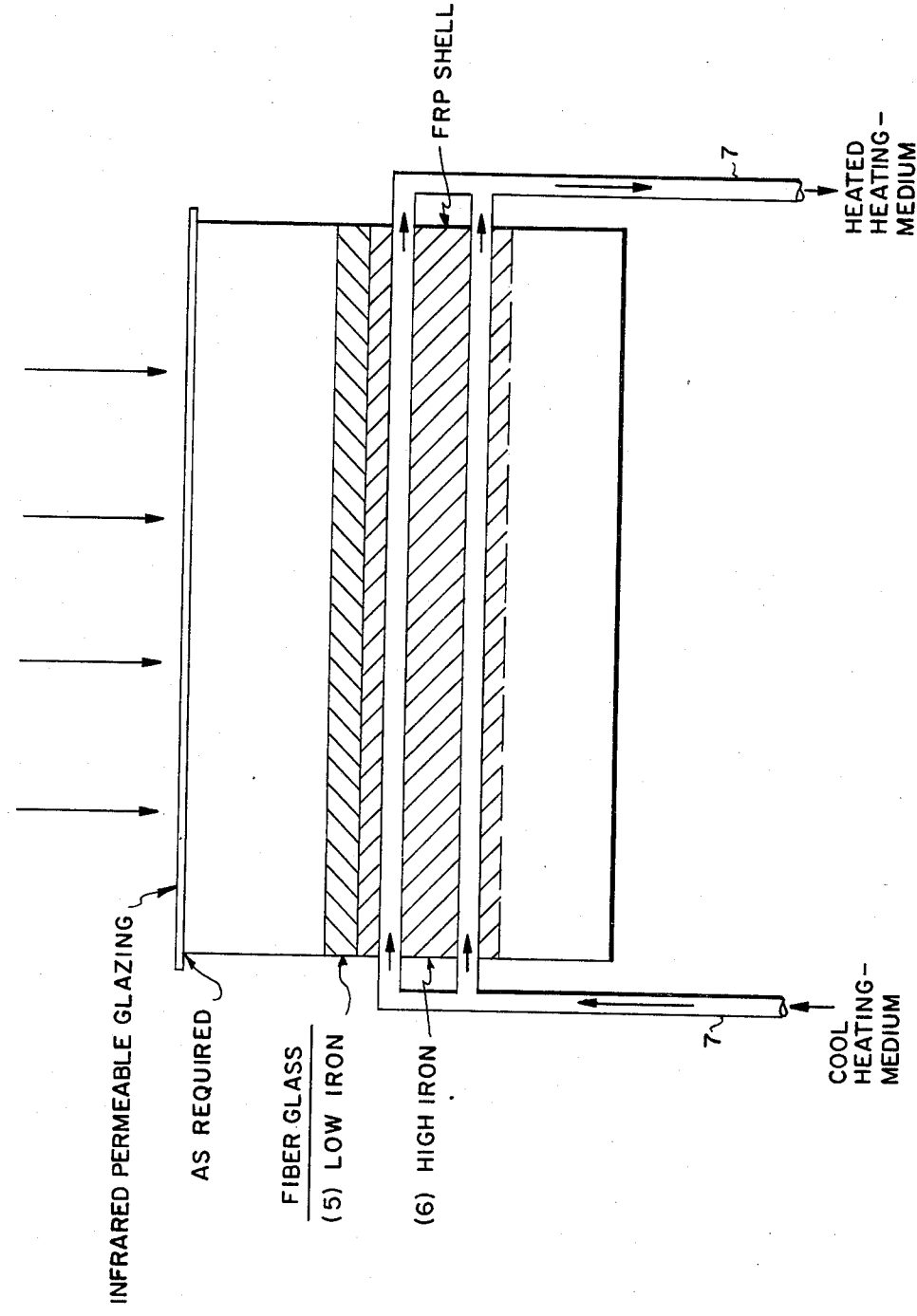

SOLAR ENERGY COLLECTOR

BACKGROUND OF THE INVENTION

This invention resulted from an experimental program to develop an extremely cheap yet lightweight solar collector. Although many types of solar collectors have been covered by patents, most of these are the so-called flat-plate collector which by its very nature has many disadvantages. It is the purpose of this invention to overcome these disadvantages and at the same time develop a collector which will be relatively low-cost in materials and construction.

PRIOR ART

In general, the flat-plate solar collectors, which are by far the most common in commercial application at this time, utilize the same technical principles. The flat plate, usually of metal, typically copper or aluminum, is coated with a heat-absorbing material which converts the energy in solar radiation into heat within the thin surface coating. This heat in turn is conducted through the plate and transferred to the heat-collecting fluid which can be either a liquid or gas. By the very nature of heat transfer, it is obvious that the temperature of the collector surface must be somewhat greater than the temperature attained by the heat-collecting fluid, typically in the range of 160°–240° F. Although the wave lengths of the energy in the solar radiation striking the collector surface are largely within the limits of the visible spectrum (0.4–0.7 microns), the hot surface of the collector itself becomes a radiator of infra-red energy which in turn is reradiated back towards the source of the solar radiation. In order to contain this infra-red energy within the collector, it is necessary to include as part of the collector solar windows, typically soda-lime glass, which are transparent to the visible spectrum but tend to absorb the energy in the infrared range. This is the well-known so-called "greenhouse effect". Since the reradiated infra-red energy is actually absorbed by the window glass, this glass must necessarily increase in temperature, reradiating or reflecting a portion of the acquired infra-red heat back into the collector, although some of this absorbed energy is transferred by conduction through the glass and is lost by convection and radiation on the outer side. For this reason, it has been common practice in the construction of flat-plate solar collectors to use two panes of glass separated by a confined air space, which serves as an insulating layer to minimize the loss of the infra-red energy which has been absorbed and converted to heat by the inner pane of glass.

The necessity to use glasses which are not transparent to infra-red energy is in itself a disadvantage, since the entire available energy of the incident solar radiation includes a substantial amount in the infra-red range (wave lengths greater than 0.7 microns) which is then shielded from passing through the glass to the collector surface. Thus, when glass is used as the "greenhouse" protection against reradiation, a portion of the solar energy which is available for conversion to useful heat is not allowed to enter the collector and is thus not available for conversion to thermal energy.

An additional disadvantage of the conventional solar collectors is the weight and cost of the unit. The collector plates must be of some suitable metal which will allow transfer of the heat from converted solar energy to the collecting fluid utilized in the system. In addition, the one or two panes of glass required to establish the "greenhouse" protection for the recovered heat must be of sufficient thickness, usually at least one-quarter of an inch, to give the structural strength required to protect the collector system from breakage. This adds considerable weight to the collector as well as a substantial increase in cost.

Another disadvantage of the flat-plate collector system involves the various heat-absorbing coatings which must be carefully applied to the metal plate. These coatings in turn may deteriorate with use, requiring disassembly of the unit for the necessary repair procedures. It is thus obvious that the typical solar collectors available today are heavy, relatively costly, and subject to breakage.

BRIEF DESCRIPTION OF THE DRAWINGS

FIG. 1 illustrates the passage of lights rays 1–6 through a random fiber in the glass wool matt; while

FIG. 3 illustrates one embodiment of the solar collector including a first layer of glass fiber (5), whose chemical composition permits only minor attentuation of the solar energy rays that pass through these fibers, a second layer of glass fibers (6), whose chemical composition permits absorption and greater attentuation of solar energy into heat than the first layer, and pipe (7) embedded within the second layer of glass fibers (6), which pipe is made up of a heat-conducting material, through which a heat-transfer medium (heating-medium) passes for collection of heat.

DESCRIPTION OF THE INVENTION

Figure 1:
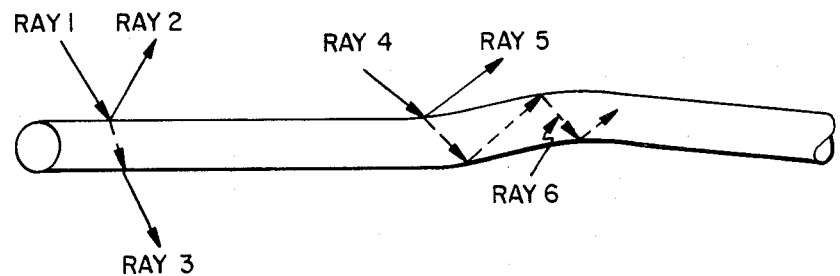

It is the purpose of this invention to overcome the disadvantages described previously for the common flat-plate solar collector available in the market-place today. In order to accomplish this, advantage is taken of the physical and optical properties of fiberglass, typical of that currently in use for insulation purposes. An extremely low-cost lightweight collector system is thus possible. Considering first the optical properties of glass, and fiberglass in particular, reference is made to FIG. 1. In this case a single fiber of glass is depicted which is a part of a bundle of glass wool or batt. Since this particular fiber is located somewhere below the surface of the wool matt, it is assumed that rays of solar light are striking the fiber at many random angles, since they have previously been reflected, refracted and otherwise bent in their travel through the overlying layers of glass fiber. In the case of Ray 1, which strikes the fiber at a steep angle approaching 90°, some of the ray will be reflected back, as is indicated by Ray 2. Some of the light energy will pass directly through the fiber and be emitted through the far side as Ray 3. Because of the random angles at which the rays of sunlight are striking at various fibers, it is assumed that some rays, such as Ray 4 will strike the fiber at a sufficiently low angle that the proportion not reflected (Ray 5) will, upon entering the fiber, be trapped within it (Ray 6) because of the critical refractive angle phenomenon, and will continue to pass down the length of the fiber. It is this very phenomenon that is currently being utilized in the development of fiber optics for the transmission of telephonic and other electronic signals which have been modulated upon a ray of light and directed into a glass fiber. In the case of fiber optics, however, it is desired that the chemical composition of the glass be of such high purity that there is a minimum tendency for attenuation of the energy in the light beam in order that it will pass through a substantial length of the fiber before being reduced to a negligible energy state. In contrast, in this invention it is desired that the purity of the glass be such, particularly in reference to the presence of multivalent metallic ions, such as iron, chromium, nickel, cobalt, manganese and the like, that in a very short length of fiber the solar energy contained in the trapped beam of light will be absorbed and converted to heat energy by the attenuation of the light beam resulting from the presence of the metallic ions. For example, in a typical type of amber glass conventionally used for malt beverage containers, a ray of light in the visible spectrum will lose 99% of its energy, that is, 99% of the light energy will be converted to thermal energy by raising the temperature of the fiber, after passing through a total path length of the amber glass of about 3 centimeters. In short, it is the purpose of this invention to utilize glass fibers of such chemical composition that solar energy contained in the rays of sunlight will be converted to heat energy after passing through a predetermined length of fiber.

Figure 2:
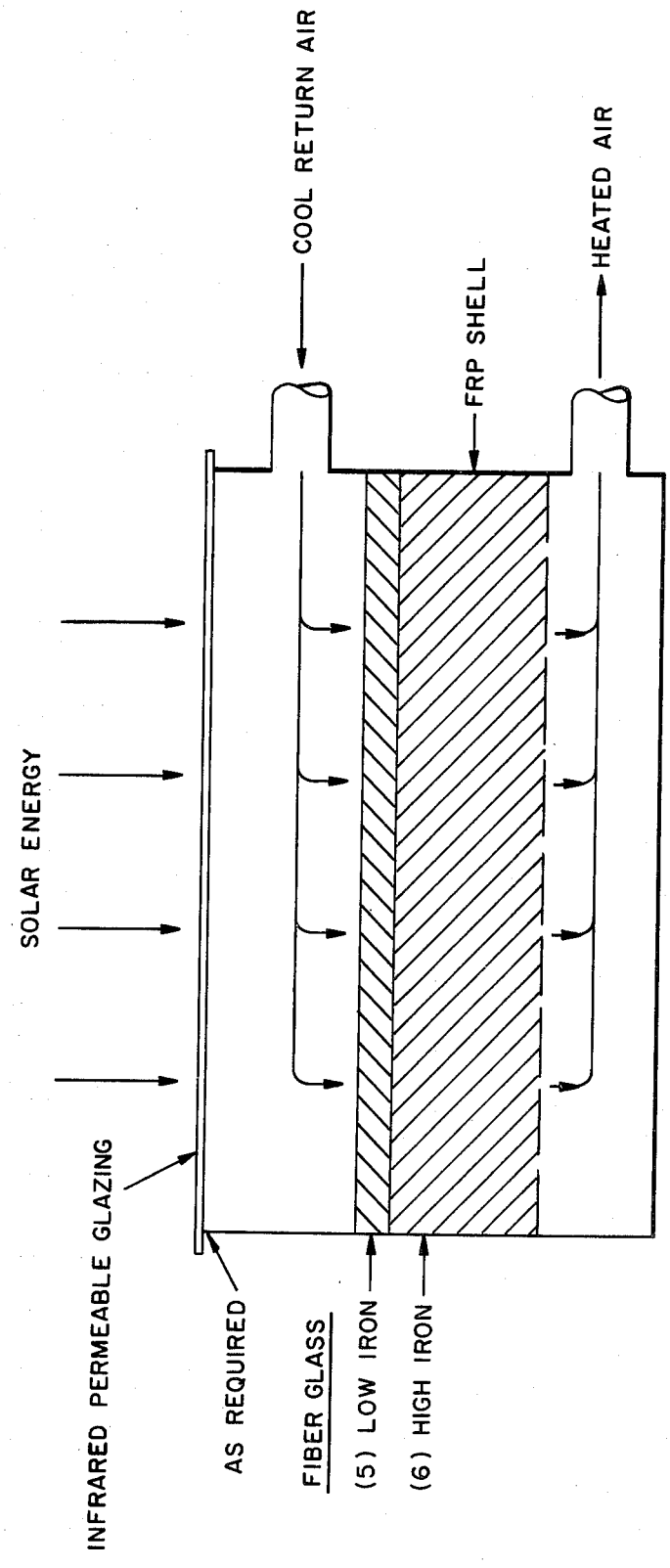
FIG. 2 illustrates one embodiment of the solar collector including a first layer of glass fiber (5), whose chemical composition permits only minor attenuation of the solar energy rays that pass through these fibers, a second layer of glass fibers (6), whose chemical composition permits absorption and greater attenuation of solar energy into heat than the first layer, and openings for admitting air into and out of the layers of glass fibers.

The second important principle embodied in this application of glass fibers for the collection and conversion of solar energy is illustrated in FIG. 2. As the figure illustrates, the uppermost layers of glass fibers (5) exposed to the direct incidence of the rays of solar energy, are intended to be of glass of chemical composition such that only minor attenuation of the solar energy occurs as this light passes through the upper layers of the glass matt. As the figure indicates, the layer of glass wool or other similar fibrous material designated as 6, is intended to be of such chemical composition that the absorption and conversion of solar energy to heat occurs fairly rapidly. The purpose of the relatively transparent overlay layer (5) is to serve as an insulating layer which will not particularly rise in temperature above the ambient or temperature of the incoming heat-transfer fluid, be it air or liquid. By this technique then, the layer of glass wool which "sees" the incoming source of solar energy is at a relatively low temperature, and thus the tendency to reradiate infra-red energy as generated by the higher temperatures in the bed will be greatly reduced compared with flat-plate collectors. Thus the uppermost layer of wool isolates (and insulates) the layers of glass in which the major portion of the heat is being generated, and, consequently, the need for the "greenhouse effect" as is required with the conventional flat-plate collector is much less important. This has several advantages. First, it is not necessary to use thick and/or double layers of heavy, expensive window glass to create the "greenhouse" protection, but rather it is possible to use cheaper and lighter-weight plastic material. In addition it is desirable that these plastic materials be of the variety that will transmit as much as possible of the infra-red portion of the solar spectrum, since this too, is available for conversion to heat when the protection from reradiation is not required.

In terms of heat transfer from the heated collector medium to the heat transfer fluid, the use of fiberglass wool also has the advantages over the flat-plate collector. Because of the small fiber diameter and loose packing in glass wool, a tremendous surface area is exposed. For example, in the case of typical glass wool-type insulation, there is over 72 square feet of fiber surface area per inch of wool in one square foot of cross-section. Thus, when a fluid passes through the wool, the contact between the wool and the fluid is extremely intimate and heat transfer occurs very rapidly. In addition, because of the loose packing in glass wool, which often runs no more than 0.5 lbs per cubic foot in bulk density, the energy required to force the fluid (pressure drop) through the wool is extremely low. Again in the general case, with air passing through three inches of typical glass wool insulation, the pressure drop for a gas rate of 1 cu ft/min/sq ft is approximately 0.01 inches of water.

In terms of cost, glass wool is considerably cheaper than the materials and production costs required to manufacture typical flat-plate collectors. Current costs for fiberglass insulation amount to only a few cents per square foot for insulation 3 inches in thickness. In addition because of the lower cost for the plastic glazing which would be satisfactory in this application, the total cost per module for solar collectors embodying the teachings of this invention would be relatively low compared with the conventional flat-plate units now currently in use. In order to maintain both the low cost and lightweight advantages of this invention, it is further recommended that the housings which make up the module and furnish the needed structural support be fabricated from fiberglass reinforced plastic (FRP) construction. The additional external insulation required to minimize heat losses from the heat transfer fluid would presumably be essentially the same regardless of the type of collector module utilized.

It is not to be construed by this discussion that existing fiberglass types of insulation are satisfactory for this application. In general they are not, and it would be necessary to produce glasses meeting the special heat absorption requirements for each layer of the solar collector in order to maximize the advantages possible by the use of the glass fibers. Depending upon the particular applications required for the various types of solar collectors utilizing the teachings of this invention, the composition of the glass fibers in terms of the multivalent metallic ions which cause the attenuation of solar light and its conversion to heat, various types of glass fibers would need to be produced to meet these various requirements. This is, however, no problem since these various compositions are common knowledge to glass technologists and could be easily manufactured. The components required are readily available and, in fact, are commonly used in the production of other types of glass. For the outside layer of wool which is primarily for the purpose of transmitting most of the solar energy through to the inner layers of heat-absorbing fibers, glass compositions more or less typical of that currently used in flint glass for containers would be satisfactory. For example, using iron as the multivalent metallic additive, in general terms the iron contents would be of the order of 0.03–0.06% expressed as $Fe_2O_3$. The glass wools prepared for the function of converting the solar energy to heat would vary over ranges, for example of iron from 0.07 to 1.0% or higher. In addition, the state of oxidation of the iron is also involved in the absorptivity of the glass for solar radiation and this too would be regulated by the addition of typical reducing agents now used in the preparation of all types of glass, to establish the optimum conditions for the specific applications. Although the other metallic ions mentioned previously could and would be useful in this application, the concentrations required would be in the same limits (0.05–1.0%, calculated as the highest oxide state of the metal) and the state of oxidation to develop the optimum solar conversion properties of the glass would be controlled as is now the case in glass manufacture by the addition of various oxidizing agents (sodium sulfate, sodium nitrate, arsenic oxides, etc.) and reducing agents (sulphur, carbon, iron pyrite, and the like). Each specific application of this proposed collector would require its own optimum compositions and thicknesses of the various glass wools involved, but it is to be understood that the production of these is simple and in effect is possible based upon present-day glass manufacturing procedures.

A similar principle of solar heat retention, although in another medium is practiced in Israel. In these a basin is filled progressively with brines of differing salt concentrations, thus establishing concentration layers along a vertical profile. Consequently, convection currents cannot circulate through the entire depth of the pond. Rather, heat transfer between layers can occur only by conduction. Sunlight incident on the pond for the most part passes through the upper brine layers to a blackened bottom. The heat absorbed there conducts to the lowest brine layer where it is effectively trapped by the slow rate of heat transfer between layers. Temperatures near the boiling point of water can thus be obtained. At the same time, the high temperature zones in the solar collector are well-protected from infra-red reradiation back into space by the various layers of brine which are transparent to the solar energy contained in the visible wave lengths, but are opaque to the wave lengths in the infra-red region.

It should also be noted that the use of packed-bed collectors has been reported in the literature (Swartman and Ogunlade, *Solar Energy*, 10, 1966, pp 106–110). In this case, the packed beds were composed of such materials as copper screens, glass marbles, stones, and hollow celluloid spheres. Although interesting results were reported from the various tests performed in accordance with this study, commercialization of the idea has not materialized, since the collection efficiencies were not particularly superior to those obtained with flat-plate collectors, and because the cost and weight of the collectors containing such packings as stones and glass marbles were of no advantage as far as making possible collectors lighter in weight and cheaper than those of the normal flat-plate variety.

The use of permeable collector media has also been reported (Chiou, El-Wakil and Duffie, *Solar Energy*, 9, 1965, pp 73–80). In this case packings are made from such materials as slit-and-expanded aluminum foil blackened on one side, which was turned toward the sun. The solar collector was built up from several layers of the specially-prepared foils and the performance of them as solar collectors was found to be reasonably efficient. However, because of the costs involved in preparing the special packings and the necessity for a blackened heat-absorbing layer on the collectors, these too have not proved to be competitive with the flat-bed collector.

It should also be recorded that the use of glass wool has also been suggested and employed in various types of solar collectors. It should be pointed out, however, that in all cases of record the glass fibers serve merely as a substrate for a blackened coating, and in fact the use of other fibrous materials such as steel wool, excelsior (wood), and the like, all coated with a black heat-absorbing layer are similarly described. In no case has the glass wool been suggested as a solar collector based upon the optical properties of the glass itself as a transducer of solar energy to thermal energy as is the subject of this invention.

EXPERIMENTAL

In order to establish the validity of the principles covered by this invention, samples of commercially-available glass wool insulation have been subjected to test procedures. In these, wool batts several inches in thickness were exposed to direct sunlight with indicating thermometers located at various known positions below the top surface of the wool. The temperatures were recorded as a function of the time of exposure. Results typical of those which were obtained are presented in the table below.

| Sun Exposure Time - Min. | Glass Wool Temperatures - °F. Distance Below Top Wool Surface - Inches | | | |
|---|---|---|---|---|
| | 1" | 2" | 3" | 4" |
| 0 Min. | 75° F. | 75° F. | 75° F. | 75° F. |
| 2 | 97 | 88 | 78 | 75 |
| 4 | 120 | 104 | 83 | 75 |
| 6 | 140 | 120 | 89 | 77 |
| 10 | 168 | 146 | 103 | 86 |
| 15 | 189 | 167 | 115 | 95 |
| 25 | 205 | 188 | 129 | 106 |
| 40 | 213 | 198 | 139 | 116 |

It is apparent that temperatures in excess of 200° F. were readily obtained. When this wool was incorporated in a solar collector module similar to that illustrated in FIG. 2, and ambient air at a rate of about 1 cu ft/min/sq ft of exposed area was passed over and down through the wool, an average exit temperature of the heated air of 160° F. was obtained.

As an example of a glass wool which is relatively transparent to solar radiation, tests were made of a thin felt-like material commonly referred to in the trade as "veil". This product is about 0.31 mm in thickness and has a bulk density of approximately 2.7 lbs/cu ft. In order to establish the efficiency of this wool for absorbing solar radiation a Dodge Solar Meter (Model 776) was employed to measure the incident solar energy level. Meter readings were taken with increasing numbers of layers of the wool. The following results were obtained:

| Wool Thickness cm | Meter Readings Btu/hr/sq ft | | |
|---|---|---|---|
| | Input $I_o$ | Output $I_t$ | $I_t/I_o$ |
| 0 | 312 | 312 | 1 |
| 0.062 | 312 | 250 | 0.801 |
| 0.124 | 312 | 190 | 0.609 |
| 0.186 | 310 | 150 | 0.0484 |
| 0.248 | 310 | 128 | 0.413 |
| 0.31 | 310 | 102 | 0.329 |
| 0.372 | 310 | 82 | 0.265 |
| 0.434 | 302 | 68 | 0.225 |
| 0.496 | 298 | 57 | 0.191 |
| 1.12 | 305 | 7 | 0.023 |

In order to interpret these data the absorption properties of this wool were characterized by calculating the absorption coefficient as is defined by the well-kown Lambert equation.

$$I_t = I_o(e^{-at})$$

where $I_o$ = the intensity of the incident radiation
$I_t$ = the intensity of the radiation after passing through the absorbing medium
t = thickness or length of path through the absorbing medium, cm
a = absorption coefficient In this case the absorption coefficient, a, is a definite property of the material and its value depends upon the chemical and physical properties of the wool. When log ($I_t/I_o$) is plotted against the wool thickness, t, a straight line is obtained which has a slope equivalent to the absorption coefficient, a. In this case the absorption coefficient was found to have a numerical value of 3.35 $cm^{-1}$.

Thus, it is apparent that the Lambert relationship can be used to establish an equivalent absorption coefficient for a fibrous wool material. Once this value has been established for any given wool, the equation can then be used to calculate the thickness of wool needed to obtain any desired degree of attenuation in the intensity of the incident radiation.

As has been explained previously, the types of glass wool currently available for insulation purposes are not necessarily those with the optimum optical properties for converting solar energy to thermal energy according to the teachings of this invention. Glass wools much more suitable for this application must be prepared specifically in terms of the amount and valence state of the multivalent metallic ions contained therein. In particular, a wool low in heat-absorbing components, such as iron, must be available which can serve as the top layer as is indicated in FIG. 2, in which only a small portion of the incident solar energy is converted to heat, but which will by its relative transparency allow the major portion of the solar energy to be transferred to the lower layers of wool where this conversion does take place. In this manner the higher temperature zones in the wool are shielded from reradiation by the more light-transparent and thus cooler upper layer. It is this principle that is a key factor in this invention.

Although glass wools containing various contents of the suitable multivalent metallic compounds as indicated are suitable and desirable, it is not to be construed that these are the only combinations which will satisfy the principles of this invention. It should also be understood that any suitable heat transfer fluid is applicable in the pursuit of this invention. This includes air, water, and other liquids which are common in current solar collector technology. The purpose of the glass wool is to convert the solar energy to thermal energy in a manner in which reradiation is minimized and the thermal energy is then transferred to a working fluid for the normal purposes intended. Auxilliary additions to these systems, such as heat storage units and other mechanical and physical devices to control the flow of the heat transfer fluids commonly used with other solar collectors, are certainly equally applicable in use with this invention. It should also be understood that suitable coils of pipe can be imbedded at appropriate locations in the fiber glass, preferably at the zones of maximum temperature development, through which heat transfer fluids can be passed to extract the available heat. In addition, although glass fibers have been described as the basis for this invention, it is also obvious that fibers of other materials, such as plastics, slags, mineral wools, etc., which have similar optical properties for trapping and converting solar energy rays and converting this energy to heat, would be equally applicable in the practice of this invention.

While certain advantages have been described which illustrate the merits of this invention, it is to be understood that various changes and modifications can be made by those skilled in the art without departing from the scope and intent of the invention as defined in the appended claims.

What is claimed is:

1. In a solar collector comprising in combination a collector housing, first means for absorbing solar energy from incident solar radiation, second means located adjacent to the outer surface of said first means to serve as a heat insulator, and fluid means for flowing through said first means to transfer heat from said first means to said fluid means, wherein said first means is a batt of fibrous material whose chemical composition yields optical properties that permit solar rays that enter the fibrous material to be absorbed and converted to thermal energy and said second means serving as a heat insulator being a batt of fibrous material whose chemical composition yields optical properties such that greater transmission and less attenuation of the solar energy occurs in this fibrous material of the solar rays passing therethrough than in the first means.

2. The solar collector in claim 1 in which the optical properties of the fibers to absorb or transmit solar radiation in said first and second means are determined by the content and valence state of the multivalent metallic oxides contained therein.

3. The solar collector in claim 2 in which the content of multivalent metallic components contained within the fibers of said first means varies within the range of 0.07 to 1.0 weight percent.

4. The solar collector in claim 1 in which the thermal energy resulting from the absorption of the solar radiation is transferred to the heat transfer fluid by direct passage of the fluid through the fibrous batts.

5. The solar collector in claim 1 in which the thermal energy resulting from the absorption of the solar radiation is transferred to a heat transfer medium which is circulated through coils of a heat-conducting material imbedded within the first batt of fibrous material.

6. The solar collector in claim 1 in which the batts of fibrous material are composed of a glassy material.

7. The solar collector in claim 2 in which the content of multivalent metallic ions contained within the fibers of said second means varies within the range of 0.03–0.06 weight percent.

8. The solar collector in claim 1 wherein an infrared permeable glazing material is located on said housing above and remote from the first and second means and provides a space through which the heat transfer fluid flows between the second means and the glazing material.

* * * * *